United States Patent
Perry et al.

(10) Patent No.: US 10,272,793 B2
(45) Date of Patent: Apr. 30, 2019

(54) SYSTEM AND METHOD FOR DETERMINING AVAILABILITY OF VEHICLE CHARGING STATIONS

(71) Applicant: Ford Global Technologies, LLC, Dearborn, MI (US)

(72) Inventors: Evan Perry, Lake Orion, MI (US); Kevin James Rhodes, Dearborn, MI (US); Chad Bednar, Royal Oak, MI (US); Erik J. Christen, Royal Oak, MI (US); Jaswant S. Dhillon, Canton, MI (US); Joseph Giacchina, Davison, MI (US); Dale F. Jordan, III, Southfield, MI (US); Pallav Sohoni, Farmington Hills, MI (US); Yang Yang, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/478,872

(22) Filed: Apr. 4, 2017

(65) Prior Publication Data
US 2018/0281612 A1    Oct. 4, 2018

(51) Int. Cl.
*H02J 7/00* (2006.01)
*B60L 11/18* (2006.01)
(Continued)

(52) U.S. Cl.
CPC ....... *B60L 11/1838* (2013.01); *B60L 11/1861* (2013.01); *G01C 21/3614* (2013.01);
(Continued)

(58) Field of Classification Search
CPC ............... Y02T 10/7005; Y02T 90/128; Y02T 10/7088; Y02T 90/163; Y02T 90/14
(Continued)

(56) References Cited

U.S. PATENT DOCUMENTS

| 8,446,124 B2 | 5/2013 | Nagy et al. |
| 8,710,797 B2 | 4/2014 | Niwa |

(Continued)

FOREIGN PATENT DOCUMENTS

| CN | 107351705 A | 11/2017 |
| DE | 102009042627 A1 | 4/2011 |

(Continued)

OTHER PUBLICATIONS

Search Report dated Sep. 24, 2018 for GB Patent Application No. GB 1805419.7 (4 pages).

*Primary Examiner* — Arun C Williams
(74) *Attorney, Agent, or Firm* — Frank Lollo; Neal, Gerber & Eisenberg LLP; James P. Muraff

(57) ABSTRACT

Systems and methods for determining availability of a vehicle charging station are provided. One vehicle system includes a telematics unit configured to wirelessly communicate with a second telematics unit of a second vehicle electrically coupled to a charging station; a processor configured to obtain a remaining charge time from the second vehicle, using the telematics unit; and a display for displaying the remaining charge time in association with information related to the second vehicle. One method includes establishing, using a telematics unit, wireless communication with a second telematics unit of a second vehicle electrically coupled to the charging station; obtaining, using a processor, a remaining charge time from the second vehicle via the telematics unit; and displaying, on a display, the remaining charge time in association with information related to the second vehicle.

17 Claims, 4 Drawing Sheets

(51) Int. Cl.
*G01C 21/36* (2006.01)
*H04W 4/80* (2018.01)

(52) U.S. Cl.
CPC ..... *G01C 21/3644* (2013.01); *G01C 21/3667* (2013.01); *G01C 21/3682* (2013.01); *H02J 7/0021* (2013.01); *H04W 4/80* (2018.02); *B60L 2230/16* (2013.01); *G01C 21/3664* (2013.01); *H02J 2007/0096* (2013.01)

(58) Field of Classification Search
USPC ........................................................ 320/109
See application file for complete search history.

(56) References Cited

U.S. PATENT DOCUMENTS

| | | | |
|---|---|---|---|
| 8,965,669 B2 | 2/2015 | Fisher et al. | |
| 8,972,090 B2 | 3/2015 | Weslati et al. | |
| 2011/0031929 A1* | 2/2011 | Asada | H02J 7/0027 320/109 |
| 2011/0057612 A1* | 3/2011 | Taguchi | B60L 11/1824 320/109 |
| 2011/0193522 A1* | 8/2011 | Uesugi | B60L 1/003 320/109 |
| 2012/0098676 A1 | 4/2012 | Oizumi et al. | |
| 2012/0296678 A1 | 11/2012 | Boot et al. | |
| 2013/0006461 A1* | 1/2013 | Kim | B60L 11/184 701/22 |
| 2013/0024306 A1* | 1/2013 | Shah | G06Q 20/32 705/17 |
| 2013/0110296 A1* | 5/2013 | Khoo | B60L 11/1825 700/286 |
| 2015/0045985 A1 | 2/2015 | Yenamandra et al. | |
| 2015/0224888 A1* | 8/2015 | Wild | B60L 11/1824 705/26.9 |
| 2016/0339792 A1 | 11/2016 | Khoo et al. | |

FOREIGN PATENT DOCUMENTS

| | | |
|---|---|---|
| GB | 2548670 A | 9/2017 |
| JP | 2010175492 A | 8/2010 |
| JP | 2013153604 A | 8/2013 |

* cited by examiner

Nearby Charging Stations

| Station | Distance | Status | Charge Time | Message? |
|---------|----------|--------|-------------|----------|
| ID-1 | 3.4 mi | Available | N/A | N/A |
| ID-2 | 0.5 mi | P/I, charging | 46 min | N/A |
| ID-3 | 0.5 mi | P/I, not charging | N/A | ◼ |
| ID-4 | 2 mi | P/I, charging | 7 min | ◼ |
| ID-5 | 2 mi | Available | N/A | ◼ |

SYSTEM AND METHOD FOR DETERMINING AVAILABILITY OF VEHICLE CHARGING STATIONS

TECHNICAL FIELD

This application generally relates to charging stations for plug-in electric vehicles and more specifically, to locating available vehicle charging stations.

BACKGROUND

Plug-in hybrid electric vehicles (PHEV) and other electric vehicles (EV) include rechargeable batteries, or other energy storage device, that can be recharged by connecting a vehicle plug to an external power source, such as, for example, a home wall socket, electrical vehicle charging points or stations at residential and public locations, or other connections to the electrical grid. As the number of plug-in vehicles increases, the demand for public charging stations is also increasing. Some existing systems can help vehicle operators identify public charging stations within a specified range of the vehicle and may even provide navigational directions for locating the identified stations. However, in certain areas, there may be a shortage of charging spaces, and a vehicle operator may arrive at an identified charging station only to find all charging spaces occupied by other vehicles. In such cases, the vehicle operator has no recourse for finding out how much longer each vehicle will remain in their charging space and therefore, may need to seek out another charging station, or wait for an indeterminate period of time until a charging space becomes available.

Accordingly, there is still a need in the art for techniques that can help a vehicle operator identify available charging stations by determining not only the availability of public charging stations, but also the amount of charge time remaining for occupied charging spaces.

SUMMARY

The invention is intended to solve the above-noted and other problems by providing systems and methods configured to determine the availability of nearby vehicle charging stations by, among other things, (1) obtaining remaining charge times from one or more vehicles electrically coupled to nearby charging stations, (2) displaying the remaining charge time for each vehicle on a requesting vehicle's display, and (3) enabling the vehicle operator to send a message to one of the displayed vehicles for relay to a mobile device associated with the vehicle's operator, for example, in order to obtain an estimated departure time.

For example, one embodiment provides a vehicle system comprising a telematics unit configured to wirelessly communicate with a second telematics unit of a second vehicle electrically coupled to a charging station; a processor configured to obtain a remaining charge time from the second vehicle, using the telematics unit; and a display for displaying the remaining charge time in association with information related to the second vehicle.

Another example embodiment provides a method of determining availability of a vehicle charging station in a vehicle. The method includes establishing, using a telematics unit, wireless communication with a second telematics unit of a second vehicle electrically coupled to the charging station; obtaining, using a processor, a remaining charge time from the second vehicle via the telematics unit; and displaying, on a display, the remaining charge time in association with information related to the second vehicle.

As will be appreciated, this disclosure is defined by the appended claims. The description summarizes aspects of the embodiments and should not be used to limit the claims. Other implementations are contemplated in accordance with the techniques described herein, as will be apparent to one having ordinary skill in the art upon examination of the following drawings and detail description, and such implementations are intended to within the scope of this application.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
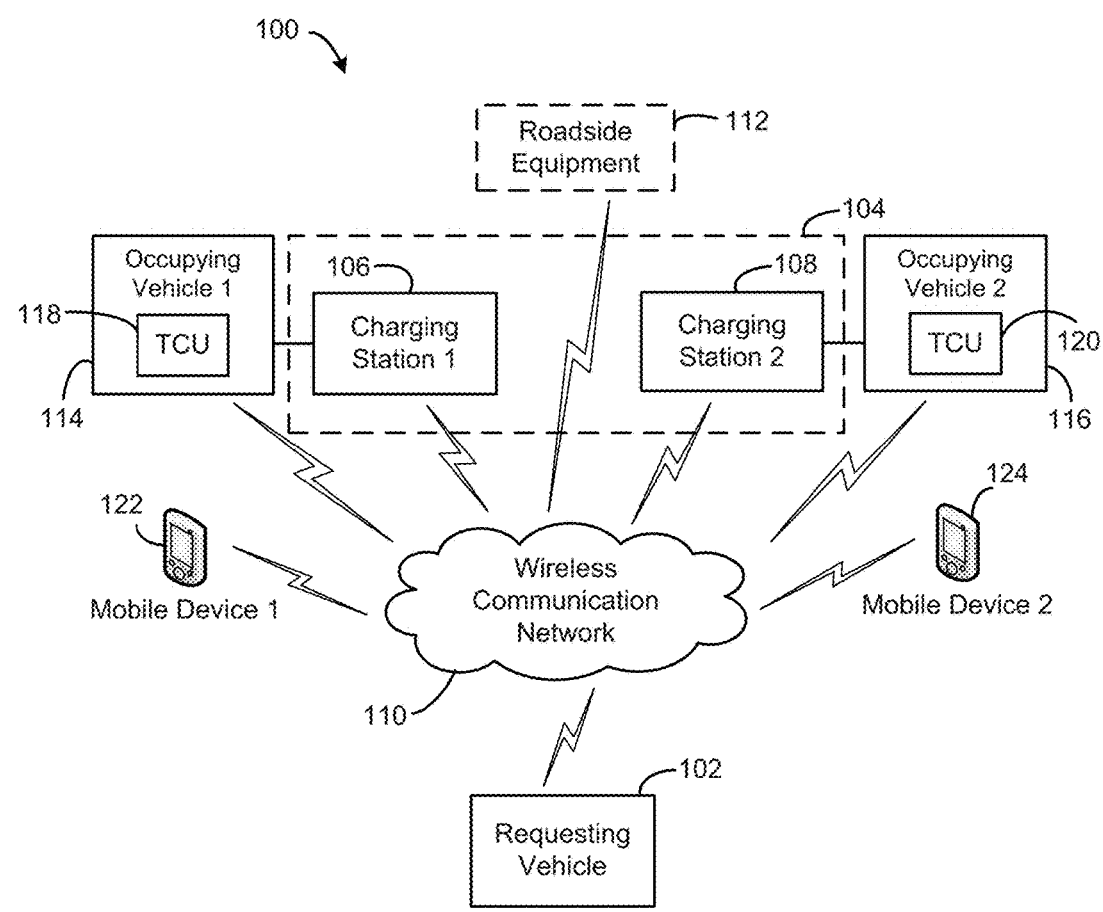
FIG. 1 is an illustration of an example environment for determining the availability of vehicle charging stations for a requesting vehicle, in accordance with certain embodiments.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an example environment 100 for determining an availability of one or more vehicle charging stations using wireless communication between a vehicle requesting availability information and at least one vehicle occupying the vehicle charging station(s), in accordance with embodiments. As shown, the environment 100 includes a requesting vehicle 102 seeking to charge a rechargeable battery of the vehicle 102. The requesting vehicle 102 can be a plug-in hybrid electric vehicle (PHEV), plug-in electric vehicle, a non-electric vehicle carrying a high voltage, rechargeable battery for secondary use, or any other type of vehicle that utilizes charging equipment to re-charge a battery of the vehicle. In embodiments, the requesting vehicle 102 may be searching for an available charging station within a predetermined distance or radius of the vehicle 102's current location.

The environment 100 further includes electric vehicle (EV) charging infrastructure 104 comprising equipment for supplying electric energy to an electric vehicle or other vehicle with a rechargeable battery. The EV charging infrastructure 104 can include one or more "nearby" charging stations (such as, for example, vehicle charging stations 106 and 108) that are within the predetermined radius of the requesting vehicle 102, as well as one or more "remote" charging stations (not shown) that are outside the predetermined radius. As will be appreciated, the classification of a given charging station as "nearby" or "remote" may change as a location of the requesting vehicle 102 changes (e.g., as the vehicle 102 travels). While FIG. 1 shows two nearby charging stations 106 and 108, it will be appreciated that the EV charging infrastructure 104 can include any number of charging stations.

The EV charging infrastructure 104 can be located at on-street parking locations or parking spaces in a public or commercial parking lot (e.g., at a shopping center, airport, hotel, place of employment, etc.). In some cases, one or more of the charging stations 106 and 108 can be part of a broader charging network that has charging stations placed at various locations and is owned and/or operated by a common charging infrastructure provider (e.g., a commercial or government entity). In some embodiments, each of the charging stations 106 and 108 shown in FIG. 1 corresponds to an individual parking location (or space) that is designated for a plug-in electric vehicle, or other vehicle with a rechargeable battery, and is adjacent to vehicle charging equipment. In other embodiments, each of the charging stations 106 and 108 corresponds to a collection of EV-designated parking spaces that share one or more vehicle charging units.

As shown, the EV charging infrastructure 104 can be communicatively coupled to the requesting vehicle 102 via a wireless communication network 110, for example, using vehicle-to-infrastructure ("V2I") and infrastructure-to-vehicle ("I2V") communication protocols. The V2I and I2V protocols may be used to convey availability status information for each of the charging stations 106 and 108 to the requesting vehicle 102. For example, the requesting vehicle 102 can include a vehicle telematics unit (such as, e.g., telematics control unit (TCU) 408 shown in FIG. 4) that is configured to facilitate communication with other components of the environment 100 via the wireless communication network 110. Similarly, each of the charging stations 106 and 108 can include at least one wireless communication module (not shown) configured to connect the charging station 106/108 to the wireless communication network 110. In some cases, each parking space associated with the charging station 106/108 may include an individual wireless communication module for communicating availability status information for that space. In other cases, each charging station 106/108 may include a central wireless communication unit for communicating availability status information for all charging spaces associated with that charging station 106/108.

In some embodiments, the environment 100 further includes one or more roadside equipment 112 that may serve as a communication intermediary between the requesting vehicle 102 and the EV charging infrastructure 104. In such cases, the roadside equipment 112 can be configured to collect availability information from each of the charging stations 106 and 108 and provide the availability information to the requesting vehicle 102. The roadside equipment 112 may include one or more wireless communication modules for communicating with the requesting vehicle 102 and the EV charging infrastructure 104 via the wireless communication network 110. In some cases, the roadside equipment 112 may be configured to share other information with the vehicle 102 and other vehicles, such as, for example, traffic reports, crash-avoidance safety information, etc.

The availability status information provided by the EV charging infrastructure 104 may include, for example, an "available" status (e.g., if a charging station is unoccupied) or an "unavailable" status (e.g., if a charging station is occupied by a vehicle). In some cases, the unavailable status may be further specified as either "plugged-in and charging" (e.g., if a charging station is supplying electrical power to a vehicle occupying the station) or "plugged-in and not charging" (e.g., if a charging station is not supplying electrical power to a vehicle occupying the station). As an example, the latter unavailable status may be assigned to a charging station if a vehicle battery remains plugged into the charging station once the battery is done charging.

In the illustrated environment, each of the charging stations 106 and 108 has an "unavailable" status because a first vehicle 114 (also referred to herein as "occupying vehicle 1") is electrically coupled to (e.g., plugged into), or otherwise occupying, the charging station 106 (also referred to herein as "charging station 1"), and a second vehicle 116 (also referred to herein as "occupying vehicle 2") is electrically coupled to, or otherwise occupying, the charging station 108 (also referred to herein as "charging station 2"). The occupying vehicles 114 and 116 can be plug-in electric vehicles or any other vehicle that is capable of utilizing the charging stations 106 and 108, respectively, to charge a rechargeable battery of the vehicle.

Each of the occupying vehicles 114 and 116 can include a vehicle telematics unit, such as telematics control units (TCUs) 118 and 120 shown in FIG. 1. The TCUs 118 and 120 can be similar to the telematics unit of the requesting vehicle 102 and can be configured to facilitate communication with other components of the environment 100 via the wireless communication network 110. For example, each of the TCUs 118 and 120 may include a wireless communication module that comprises appropriate transceivers and/or wireless modems for communicating with the telematics unit of the requesting vehicle 102 and with associated mobile devices, as described herein. In embodiments, the occupying vehicles 114 and 116 may be configured to communicate with the requesting vehicle 102 via the wireless communication network 110 using a vehicle-to-vehicle (V2V) communication protocol.

In some cases, the vehicle occupying a charging station can be communicatively coupled to at least one mobile device associated with the vehicle, via the wireless communication network 110, using a vehicle-to-device ("V2D") communication protocol. For example, in FIG. 1, the occupying vehicle 114 is communicatively coupled to a mobile device 122 belonging to an operator of the vehicle 114, and the occupying vehicle 116 is communicatively coupled to a mobile device 124 belonging to an operator of the vehicle 116. While FIG. 1 shows only two mobile devices 122 and 124, it will be appreciated that the environment 100 may include any number of mobile devices. For example, in some embodiments, the environment 100 includes at least one mobile device for each vehicle occupying a charging station of the EV charging infrastructure 104.

The mobile devices 122 and 124 can be any type of electronic computing device, such as, for example, a mobile communications device (e.g., smartphone, tablet, etc.) or a personal computing device (e.g., laptop, PC, etc.). Further, each of the mobile devices 122 and 124 can include a wireless communication module (not shown) that is configured to communicate with the wireless communication network 110. For example, the wireless communication module may include one or more radio transmitters, receivers, and/or transceivers, modems, antennas, and corresponding wireless communication circuitry.

In some cases, the TCUs 118 and 120 of the occupying vehicles 114 and 116 may require access to different wireless communication networks in order to communicate with the telematics unit of the requesting vehicle 102, which, for example, may be linked to a WPAN, or other short-range network, and the mobile devices 122 and 124, which, for example, may be accessible via an internet access network, a cellular network, or other long-range network. For example, the TCUs 118 and 120 can include a wireless modem configured to communicate over WLAN or Wi-Fi to facilitate communication between the occupying vehicles 114 and 116 and the mobile devices 122 and 124, respectively. In addition, the TCUs 118 and 120 can include one or more short-range transceivers configured to communicate over Bluetooth, Zigbee, or other short-range network to facilitate communication between the requesting vehicle 102 and the occupying vehicles 114 and 116 and/or the charging stations 106 and 108.

The wireless communication network 110 can include one or more different types of wireless communication networks in order to create a wireless system for implementing the connected vehicle environment 100 shown in FIG. 1. For example, the wireless communication network 110 may include internet access networks (such as, e.g., Wi-Fi, WLAN, WMAN, WWAN, etc.), wireless personal area networks (WPANs) (such as, e.g., Bluetooth, Zigbee, infrared, etc.), digital cellular networks (such as, e.g., LTE, LTE-Advanced, GSM, CDMA, GPRS, 3G, etc.), satellite networks, and short-range communication networks (such as, e.g., dedicated short-range communication (DSRC), radio frequency identification (RFID), near field communication (NFC), etc.). In some cases, two or more different types of wireless communication technology may be used to implement the environment 100. For example, a first communication network may be used for communication between the EV charging infrastructure 104, the requesting vehicle 102, and/or the occupying vehicles 114 and 116, and a second communication network may be used for communication between the occupying vehicles 114 and 116 and the mobile devices 122 and 124, respectively.

In a preferred embodiment, the components of the environment 100 (e.g., the vehicles 102, 106, and 108, the EV charging infrastructure 104, the roadside equipment 112, and/or the mobile devices 122 and 124) are configured to wirelessly communicate with each other over a dedicated short range communication (DSRC) network, or using any other wireless technology that can provide very high data transmission, low latency, and reliable performance in high vehicle speeds and extreme weather conditions. As will be appreciated, dedicated short range communications (DSRC) is a two-way, short-range or medium-range wireless communications technology that is designed for automotive use to exchange a wide range of information in vehicle-to-vehicle (V2V) applications, vehicle-to-infrastructure (V2I) applications, and in some cases, vehicle-to-device (V2D) applications. For example, DSRC technology has been proposed for use in a number of automotive or roadside applications, including, for example, improve traffic safety, provide accident reports, convey approaching emergency vehicle warnings and/or sudden braking ahead warnings, and accept electronic parking and toll payments. Because the DSRC range is relatively short (e.g., 100-1000 meters), DSRC infrastructure (or roadside units) will be widely and densely deployed at intersections and along roadways within a given metropolitan area in order to facilitate communication across the entire area and form a robust DSRC network. Compared to other wireless technologies (e.g., WiFi, satellite, Near Field Communication (NFC), Bluetooth, etc.), DSRC technology can permit secure, reliable communications directly between vehicles, or between vehicles and roadside units (e.g., over a dedicated communications channel), and can be used to conduct point-to-point wireless communications (e.g., wireless messages directed at a specific vehicle or roadside unit), as well as to broadcast wireless messages to all vehicles and roadside units within a limited broadcast area. In the United States, DSRC is allocated for high frequency radio transmission, for example, in a dedicated 75 MHz spectrum band around 5.9 GHz.

Each of the charging stations 106 and 108 can include a computing device (not shown) comprising a memory or data storage device and a data processor, in addition to the wireless communication module to carry out the techniques described herein. The wireless communication module can interact with one or more components of the environment 100 and/or different networks within the wireless communication network 110 depending on the communication needs of the EV charging infrastructure 104. For example, in embodiments, the wireless communication module can include one or more short-range transceiver(s) to facilitate WPAN communications (e.g., Bluetooth, Zigbee, DSRC, etc.), a wireless transceiver to facilitate WLAN communications (e.g., WiFi, etc.), and/or a cellular transceiver to facilitate cellular communications (e.g., LTE, 3G, etc.). The wireless communication module may also include one or more modems, antennas, and corresponding wireless communication circuitry, as will be appreciated. In some embodiments, the charging stations 106 and 108 may be communicatively coupled to the roadside equipment 112, a charging infrastructure provider (not shown), or a remote server (not shown) associated therewith, via the wireless communication network 110, to facilitate aspects of the techniques disclosed herein.

In embodiments, the requesting vehicle 102 can be configured to communicate with only a select group of the charging stations included in the EV charging infrastructure 104, such as, e.g., the charging stations 106 and 108 shown in FIG. 1. The select charging stations can be dynamically determined based on geographical limits and/or other criteria associated with the requesting vehicle 102, such as, for example, specific charging infrastructure provider(s) or a charging station's compatibility with the requesting vehicle's battery. In some cases, an operator of the requesting vehicle 102 may define a maximum distance the operator is willing to travel in order to reach an available charging station (e.g., 5 miles, 10 miles, etc.). In other cases, the vehicle computing system (VCS) of the requesting vehicle 102 may automatically determine a maximum distance the vehicle 102 can travel based on a battery life, charge state, or remaining charge amount of the battery to be recharged, for example, using a battery control module (e.g., battery control module 512 of FIG. 5) of the VCS. In either case, the distance criteria can be used by the VCS of the requesting vehicle 102 to identify a select group of charging stations (e.g., nearby charging stations) for the purposes of determining availability. For example, the distance criteria may be used to define a radius around a current location of the requesting vehicle 102, and any charging stations falling within that radius may be included in the select group of charging stations.

In embodiments, the VCS of the requesting vehicle 102 may include a charging station locator (e.g., charging station locator 514 shown in FIG. 5) configured to determine the select group of charging stations using software instructions stored in a memory and executed by a processor of the VCS. In some cases, the charging station locator selects the group of nearby charging stations by applying the distance criteria to a predetermined list of possible charging stations. For example, the predetermined list may be stored in a memory of the VCS, or otherwise included in the charging station locator, and may include charging stations that are pre-selected by a manufacturer of the vehicle 102, a charging infrastructure provider associated with the vehicle 102, or other entity providing services related to charging the vehicle 102. As another example, the charging station locator may retrieve the predetermined list of possible charging stations from the EV charging infrastructure 104, the roadside equipment 112, or a remote server (not shown) in communication with the requesting vehicle 102 using the wireless communication network 110.

In some embodiments, the charging station locator obtains address information, GPS coordinates, or other geographical location information for the plurality of charging stations and applies the distance criteria to the location information to identify the select group of charging stations. In some cases, the charging station locator obtains the geographical location information from the charging stations themselves using V2I communication. For example, each charging station may provide its GPS coordinates to the requesting vehicle 102. In other cases, the charging station locator may receive the location information for each of the charging stations from a location-determining receiver (e.g., Global Positioning System (GPS) receiver) included in the vehicle. In still other cases, the charging station location may retrieve the location information from a memory of the vehicle (e.g., data storage device 504 shown in FIG. 5). For example, the location information may be stored in the vehicle memory in association with the list of possible charging stations.

Various scenarios may arise in the environment 100 that create a need for communication between the requesting vehicle 102 and one or more of the occupying vehicles 114 and 116, and/or an operator of the requesting vehicle 102 and an operator of one or more of the occupying vehicles 114 and 116. For example, the vehicle 102 may request charging status information (e.g., a remaining charge time) from the vehicles 114 and 116 occupying the charging stations 106 and 108, respectively. As another example, the operator of the requesting vehicle 102 may ask the operator of one of the occupying vehicles 114, 116 for an estimated departure time, or how much longer the operator plans to remain at the corresponding charging station 106, 108.

Embodiments described herein provide a communication tool for facilitating these and other exchanges between the requesting vehicle 102 and one or more occupying vehicles 114, 116, or other components of the environment 100, using the wireless communication network 110. For example, one embodiment includes a vehicle system (e.g., VCS 500 in FIG. 5) configured to implement aspects of the communication tool, the charging station locator, and other techniques described herein. Another example embodiment includes a process (e.g., method 200 in FIG. 2) for implementing aspects of the communication tool, the charging station locator, and other techniques described herein.

According to embodiments, each vehicle included in the environment 100 may operate as the requesting vehicle and/or one of the occupying vehicles, depending on the particular situation. For example, in another scenario, the requesting vehicle 102 may be parked at one of the charging stations 106 and 108, and one of the occupying vehicles 114 and 116 may be looking for an available charging station. Accordingly, though the examples described herein may refer to components of the requesting vehicle 102, each of the occupying vehicles 114 and 116 may also be configured to implement the communication tool, charging station locator, and other techniques described herein.

Aspects of the communication tool can be implemented in the requesting vehicle 102 and/or the occupying vehicles 114 and 116 as a messaging application for, among other things, enabling an operator of a first vehicle to enter, select, or generate a message to the operator of a second vehicle, via a user interface or human-machine interface (HMI) of the first vehicle, and providing the message, via the telematics unit of the first vehicle, to the telematics unit of the second vehicle for relay to the operator thereof. In some embodiments, the messaging application (e.g., messaging application 516 shown in FIG. 5) can be implemented as software instructions stored in a memory (e.g., data storage device 504 shown in FIG. 5) and executed by a processor (e.g., data processor 502 shown in FIG. 5) of a vehicle computing system included in the vehicle.

In some embodiments, each communication (e.g., a message or request) received by the occupying vehicle 114/116, via the communication tool, can indicate whether the communication is intended for a vehicle computing system of the occupying vehicle 114, 116, or for the operator of the occupying vehicle 114, 116. For example, if the communication is a request for remaining charge time, the vehicle computing system of the occupying vehicle 114/116 may be configured to calculate or otherwise determine an amount of time remaining until the battery plugged into the charging station 106/108 is fully charged. As another example, if the communication is a request for estimated departure time, the vehicle computing system of the occupying vehicle 114/116 may be configured to use a pre-established communication routine to relay the communication to an operator of the vehicle 114/116.

In embodiments, the pre-established communication routine may involve relaying the communication to a mobile device associated with the occupying vehicle. For example, each of the occupying vehicles 114 and 116 may use the pre-established communication routine to convey messages received by the telematics unit of the vehicle 114/116 to the mobile device 122/124. The pre-established communication routine may specify which messages to convey, such as, for example, only messages addressed to the vehicle operator, and how to route the messages to the operator (e.g., via text message, email, phone call, or a chat interface for electric vehicle operators). In addition, the pre-established communication routine may provide for bi-directional communication between the occupying vehicle 114/116 and the operator of the vehicle 114/116, so that the operator can send a reply message to the requesting vehicle 102 (e.g., a reply messaging comprising the vehicle's estimated departure time). In embodiments, the pre-established communication routine can form part of the communication tool and can be stored in a memory of the vehicle (e.g., data storage device 504 shown in FIG. 5).

The communication tool may be designed to provide anonymity to both parties of the communication by ensuring that the contact information (e.g., name, email address, phone number, etc.) for each vehicle operator is not shared with the rest of the network. For example, the communication tool may enable the operator of the requesting vehicle 102 to generate a real-time (or near real-time) message to the operator of an occupying vehicle 114/116 and send the user-generated message to the occupying vehicle 114/116 with an instruction to relay the message to the vehicle operator. The occupying vehicle 114/116 (or a telematics unit thereof) may relay the user-generated message to the operator of the occupying vehicle using the pre-established communication routine. This relay technique ensures a wall of privacy between the two unknown parties, while still enabling real-time communication using previously established channels.

The requesting vehicle 102 can include one or more input devices (e.g., input devices 526 shown in FIG. 5) and a display screen (e.g., display 524 shown in FIG. 5) to facilitate creation of a message to the operator of the occupying vehicle 114/116. The messaging application can be configured to convert the user-generated message to an anonymous message before sending the message to the occupying vehicle 114/116. For example, the messaging application can be configured to remove any identifying information (e.g., name, IP address, phone number, metadata, digital tags, etc.) from the message, so as to not reveal an identity of the operator and/or the requesting vehicle 102. In some cases, the operator can choose a desired level of anonymity for the user-generated message, for example, by selecting whether to include a name, a callback number, or an email address. The messaging application can be configured to enable the user to enter text, record a video, capture an image, record a voice message, compose an email, and/or generate other types of messages to the operator of the occupying vehicle 114/116 using the input devices of the requesting vehicle 102.

In some embodiments, the requesting vehicle 102 can be configured to communicate messages directly to the TCUs 118 and 120 using point-to-point, or vehicle-to-vehicle (V2V), communication. In other cases, the requesting vehicle 102 can be configured to broadcast the message to the roadside equipment 112 or other DSRC infrastructure and the roadside equipment 112 can be configured to relay the message to its intended destination (e.g., one of the occupying vehicles 114 and 116) using vehicle-to-infrastructure (V2I) and/or infrastructure-to-vehicle (I2V) communications. In such cases, the telematics unit of the requesting vehicle 102 can send the user-generated message to the roadside equipment 112 and indicate the intended recipient as being the occupying vehicle 114/116. The roadside equipment can then forward the received message to the TCU 118/120 of the intended occupying vehicle 114/116 for relay to the mobile device 122/124 associated with the vehicle 114/116 via the pre-established communication routine.

Figure 2:
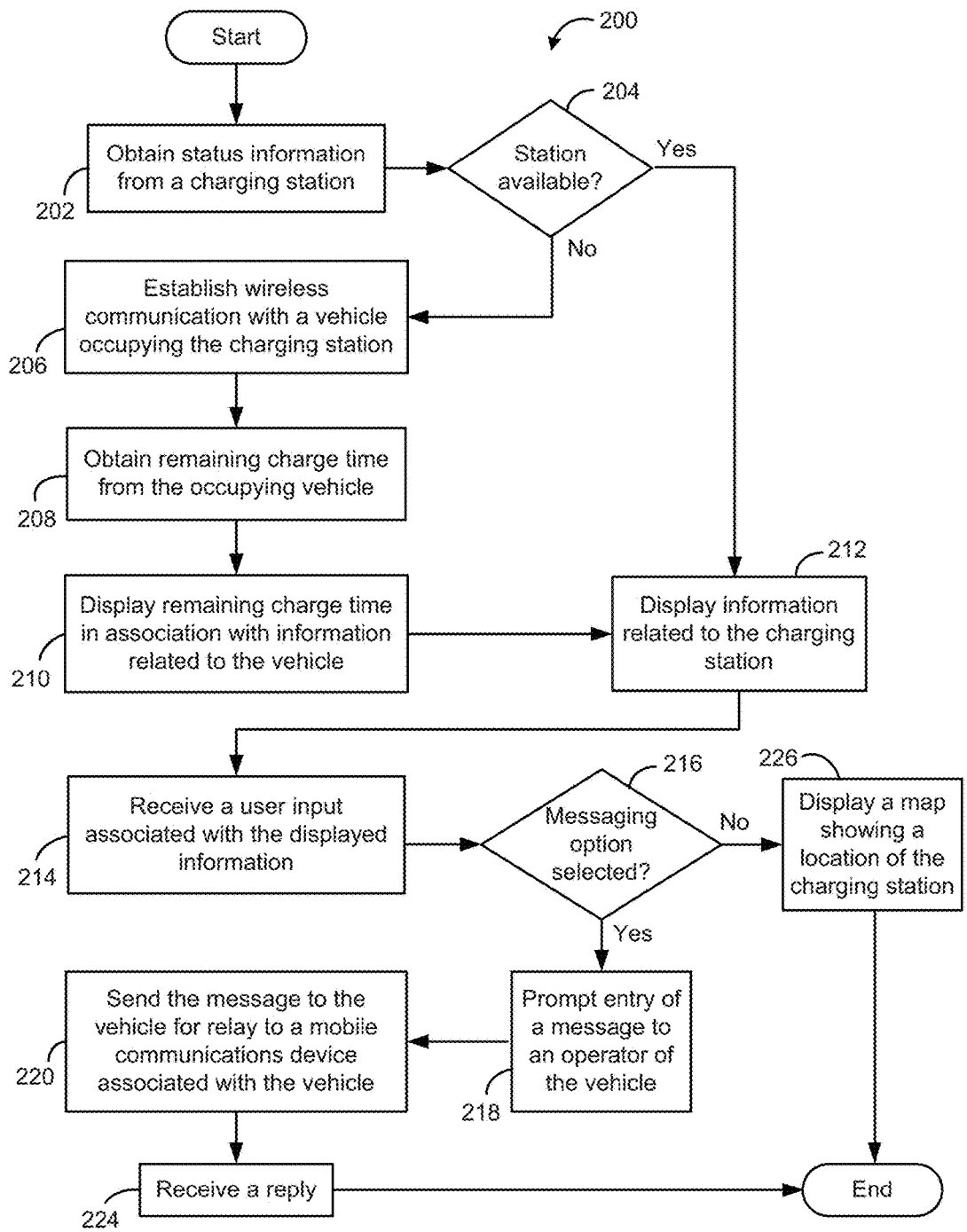
FIG. 2 is a flow diagram of an example method of determining an availability of a vehicle charging station for the requesting vehicle of FIG. 1, in accordance with certain embodiments.

FIG. 2 illustrates an example method 200 for determining an availability of a selected vehicle charging station using wireless communication between a first vehicle seeking to recharge a vehicle battery and a second vehicle occupying the vehicle charging station, in accordance with embodiments. The method 200 can be carried out by the first vehicle (e.g., the requesting vehicle 102 shown in FIG. 1), or more specifically, a vehicle computing system included therein, such as, e.g., vehicle computing system (VCS) 500 shown in FIG. 5. In addition, to carry out the operations of the method 200, the first vehicle can interact with the second vehicle (e.g., one of the occupying vehicles 114 and 116 shown in FIG. 1) and, in some cases, one or more other components of the environment 100 shown in FIG. 1, such as, for example, one or more of the charging stations 106 and 108, the other occupying vehicle 116/114, one or more of the mobile devices 122 and 124, and/or the roadside equipment 112, using the wireless communication network 110. In embodiments, the wireless communication network 110 may be a DSRC network for facilitating vehicle to vehicle communication ("V2V"), vehicle to infrastructure communication ("V2I"), and/or vehicle to device communication ("V2D"). In one embodiment, the method 200 is implemented, at least in part, by data processor 502 executing software stored in data storage device 504, including charging station locator 514 and messaging application 516, as shown in FIG. 5.

The method 200 can begin at step 202, where the processor obtains status information from a charging station, using a telematics unit of the first vehicle (e.g., TCU 508 shown in FIG. 5), to determine whether the charging station is available for charging or occupied by another vehicle. The status information may include indicators such as, for example, "available" or "unavailable," "occupied" or "unoccupied," and/or "plugged-in and charging" or "plugged-in and not charging." In some embodiments, the processor may obtain availability status information from a group of "nearby charging stations," or all charging stations within a predetermined radius of a current location of the first vehicle. In such cases, obtaining status information at step 202 can include the processor generating a request for availability status information, obtaining a list of nearby charging stations, and providing the request and the list to the telematics unit. Step 202 can further include the telematics unit sending the request to all nearby charging stations, receiving availability status information from each of the nearby charging stations, and providing the received status information to the processor for further processing.

The predetermined radius used to determine the group of nearby charging stations can be defined by distance criteria stored in a memory (e.g., data storage device 504 shown in FIG. 5) or received by the processor. For example, in some cases, the distance criteria may be a value (e.g., 1 mile, 2 miles, etc.) entered or selected by a driver or operator of the first vehicle using a human machine interface (HMI) (e.g., HMI 510 shown in FIG. 5) or other user interface of the first vehicle. In other cases, the distance criteria may be a value automatically determined by the VCS, or more specifically, a battery control module (e.g., battery control module 524 shown in FIG. 5) included therein, based on a remaining battery life of the vehicle battery and how far the vehicle can travel based on that battery life.

Figure 5:
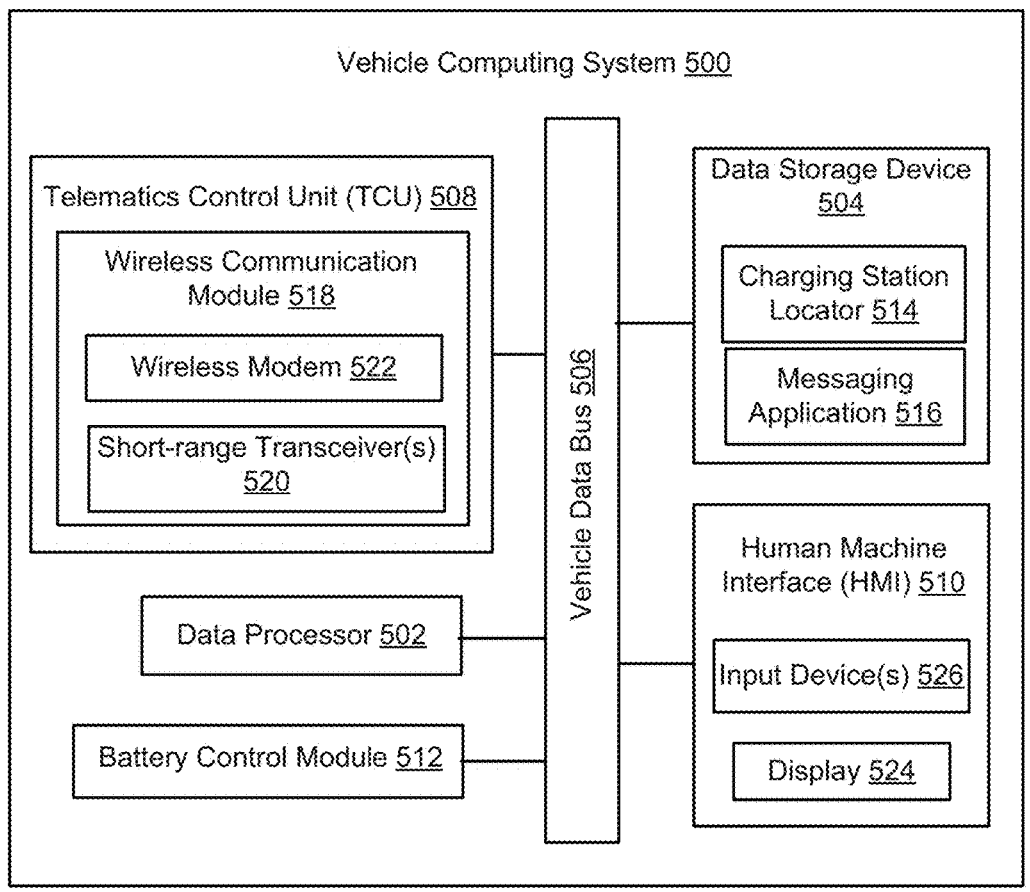
FIG. 5 is a block diagram of an example vehicle computing system included in the environment of FIG. 1, in accordance with certain embodiments.

In embodiments, the group of nearby charging stations can be determined by the processor executing a software application stored in a vehicle memory, such as, e.g., charging station locator 514 shown in FIG. 5. For example, the charging station locator may receive the distance criteria from the HMI or battery control module, retrieve geographical location information for a plurality of charging stations, and determine the group of nearby charging stations by applying the distance criteria to the location information (e.g., GPS coordinates) for each charging station. The geographical information may be obtained from the charging station (e.g., at step 202) or a remote server (e.g., a GPS server) using the telematics unit of the first vehicle, or from charging station information stored in a memory of the first vehicle (e.g., in association with the list of possible charging stations).

In embodiments, the method 200 includes step 204, where the processor determines whether a given charging station is available based on the status information received at step 202. If the charging station is not available, the method 200 moves onto step 206, where the processor establishes wireless communication with a vehicle (e.g., the second vehicle) electrically coupled to, or otherwise occupying, the charging station by communicatively connecting the first telematics unit of the first vehicle with a second telematics unit of the second vehicle. In some embodiments, the processor may establish wireless communication with each vehicle occupying the nearby charging stations contacted in step 202.

The wireless communication may be established by the first telematics unit "pinging" the second telematics unit or otherwise contacting the second telematics unit to verify that the unit is available for wireless communication. For example, the first telematics unit may ping the second telematics unit by sending an initial communication request using a wireless communication network (e.g., wireless communication network 110 shown in FIG. 1) to the second telematics unit, and the second telematics unit may confirm its presence by sending a reply message back to the first telematics unit via the wireless communication network.

The method 200 further includes step 208, where the processor obtains a remaining charge time from the second vehicle occupying the charging station using the first telematics unit of the first vehicle. The remaining charge time can be an amount of time remaining until a rechargeable battery of the second vehicle has been completely charged (e.g., 15 minutes, 32 minutes, etc.). In embodiments, obtaining the remaining charge time at step 208 may include the processor generating a request for remaining charge time, sending the request to the second vehicle using the first telematics unit, and receiving remaining charge time information from the second vehicle, via the telematics unit of the first vehicle, in response to the request.

As shown in FIG. 2, the method 200 also includes step 210, where the processor displays, on a vehicle display (e.g., display 524 shown in FIG. 1), a remaining charge time for the second vehicle in association with information related to that vehicle. For example, the vehicle information may include a description or identification of the second vehicle (e.g., vehicle identification information), such as a make and model of the second vehicle, a body color of the second vehicle, and/or a license plate number assigned to the second vehicle. In some cases, the vehicle information includes messaging capability information for the second vehicle. The messaging capability information can indicate whether or not the second vehicle is capable of relaying messages to an operator of the vehicle, or more specifically, to a mobile device (e.g., mobile devices 122 and 124 shown in FIG. 1) associated with the vehicle operator. In embodiments, the vehicle information displayed at step 210 may be received from the second vehicle at step 208 along with the remaining charge time information. For example, the request for remaining charge time information may also include a request for vehicle identification information and an inquiry as to the second vehicle's messaging capability.

The method 200 can also include step 212, where the processor displays, on the vehicle display, information related to the charging station being occupied by the second vehicle, in association with the remaining charge time. For example, the charging station information may include the availability status information obtained at step 202. In some cases, the charging station information may include station identification information, such as, for example, a unique identifier assigned to the charging station (e.g., ID 1, ID 2, etc.) or a name associated with the charging station (e.g., Wells Street station, Oakbrook Mall station, etc.). The station identification information may be received from the charging station at step 202 along with the availability status information, or as part of another information exchange with the charging station using the telematics unit of the first vehicle. Alternatively, the station identification information may be retrieved from a memory of the first vehicle. For example, the station identification information may be stored in the memory in association with the list of possible charging stations and/or other charging station information.

In some cases, the charging station information displayed at step 212 may also include a distance to the charging station from the first vehicle's current location (e.g., 3.4 miles, 0.5 miles, etc.). The distance information may be calculated by the vehicle computing system of the first vehicle based on the current location of the first vehicle and address information associated with the charging station. The address information may be obtained from the charging station (e.g., at step 202) or a remote server (e.g., a GPS server) using the telematics unit of the first vehicle, or from charging station information stored in a memory of the first vehicle (e.g., in association with the list of possible charging stations).

Referring back to step 204, if the status information obtained at step 202 indicates that the charging station is available, the method 200 continues directly to step 212, where the processor displays information related to the available charging station. That is, in the case of an available charging station, vehicle information and remaining charge time information are not displayed on the display.

In embodiments, steps 210 and 212 may include displaying the vehicle and/or charging station information as user-selectable options on a user interface (e.g., user interface 300). For example, if a given vehicle has the capability to message the vehicle operator, the user interface may display the remaining charge time in association with a user-selectable messaging option (e.g., messaging icon 306 shown in FIG. 3). In such embodiments, the method 200 includes step 214, where the processor receives a user input associated with the displayed information via the user interface, the user input indicating selection of a particular charging station and/or selection of an action pertaining to said charging station.

The method 200 can further include step 216, where the processor determines whether the user input is a selection of a messaging option. If the messaging option is selected (e.g., "yes"), the method 200 continues to step 218, where the processor prompts the vehicle operator (e.g., user) to enter a message to the operator of the vehicle occupying the charging station associated with the selected messaging icon. For example, selection of the messaging icon may cause the processor to initiate a messaging application (e.g., messaging application 516 shown in FIG. 5) configured to display a prompt or text box for entering the message. The user may enter the message using an input device (e.g., input devices 526 shown in FIG. 5) or other component of the human machine interface (HMI) of the first vehicle.

At step 220, the processor sends a message entered by the user to the second vehicle for relay to a mobile device (e.g., mobiles devices 122 and 124 shown in FIG. 1) associated with said vehicle, using the telematics unit of the first vehicle. For example, the message may be received by a telematics unit of the second vehicle (e.g., the second telematics unit), and the second telematics unit may be configured to send the message to a mobile device of the vehicle operator using a pre-established communication routine, as described herein. At step 224, the processor receives a reply message from the second vehicle, via the telematics unit of the first vehicle.

In embodiments, the message sent to the second vehicle at step 222 can be a request to the second vehicle for an estimated departure time, or a time at which the operator of the second vehicle plans to vacate the charging station, and the reply message received at step 224 can include the requested information. The reply message may include the estimated departure time as an amount of time until departure (e.g., 3 hours, 20 minutes, etc.), a time of departure (e.g., 3:15 pm, 5:00 pm, etc.), or any other format selected by the operator of the second vehicle.

Referring back to step 216, if the user input is not a selection of the messaging option (e.g., "no"), the method 200 may continue to step 226. At step 226, the processor displays, on a vehicle display, a map showing a location of the charging station associated with the selected information, in response to the user input received at step 214. The operator of the first vehicle may use the map to pinpoint an exact location of the selected charging station (e.g., if there are multiple charging spaces in one area) and/or the vehicle occupying that charging station. In some embodiments, the processor may also display directions to the charging station from the current location of the first vehicle. The method 200 may end upon completion of step 226, or upon completion of step 224.

Figures 3, 4:
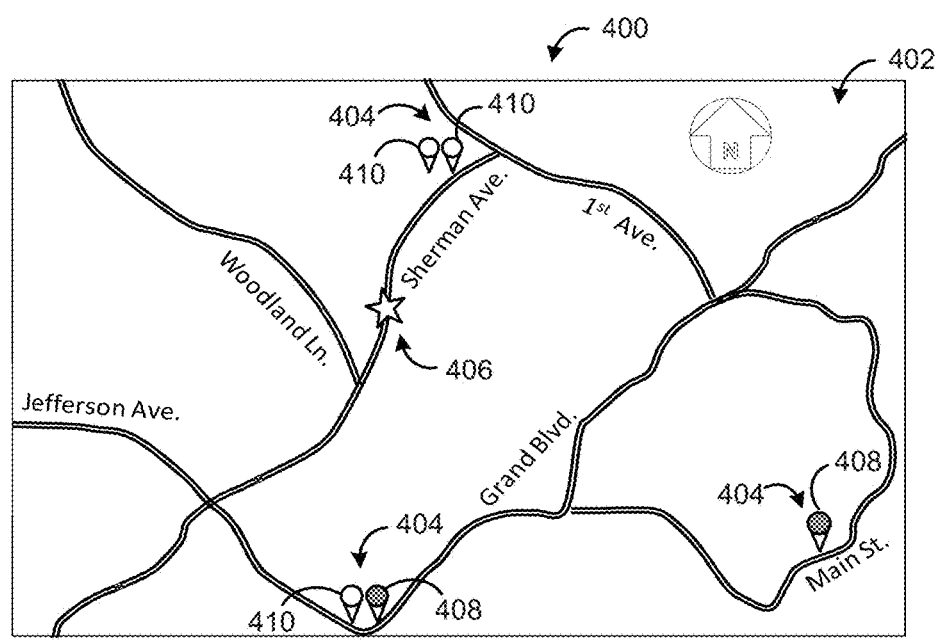
FIG. 3 is an illustration of an example user interface for display on a display of the requesting vehicle of FIG. 1, in accordance with certain embodiments.
FIG. 4 is an illustration of another example user interface for display on a display of the requesting vehicle of FIG. 1, in accordance with certain embodiments.

To illustrate steps 210 and 212 of the method 200, FIG. 3 depicts an example user interface 300 configured to display information related to a group of nearby charging stations, including information associated with any vehicle occupying the station, in accordance with embodiments. The user interface 300 can be displayed on a display screen of the first vehicle (such as, e.g., display 524 shown in FIG. 5) upon completion of step 208 and/or as part of steps 210 and 212 of the method 200 shown in FIG. 2. The group of nearby charging stations included in the user interface 300 may be selected by the processor and/or the charging station locator based on distance criteria entered by the vehicle operator or provided by the battery control module, as described herein. The information displayed in the user interface 300 may be obtained at steps 202 and 208 of the method 200 or from other sources, such as, for example a remote server or a memory of the first vehicle.

As shown in FIG. 3, the user interface 300 can be arranged as an information table or grid comprising an individual entry 302 (e.g., row) for each nearby charging station and a plurality of fields 304 (e.g., columns) displaying information for each entry 302, or more specifically, the charging station associated with the entry 302. The plurality of fields 304 can include fields for displaying charging station information and fields for displaying vehicle information. For example, in the illustrated embodiment, the plurality of fields 304 includes station identification information for the given charging station; distance information (e.g., from the first vehicle's current location to the charging station); availability status information for the charging station; remaining charge time information for a vehicle occupying the charging station, if any; and messaging capability information for the same vehicle. In other embodiments, instead of, or in addition to, the station identification information, the user interface 300 may display vehicle identification information for the vehicle occupying the charging station.

The information displayed in each field 304 may be in any format, including, for example, text (e.g., alphanumeric characters), icons, symbols, photographic images, or any combination thereof. For example, the distance information and the remaining charge time information may be displayed in a numerical format, while the availability status information may be displayed using words or phrases, and the messaging capability information may be displayed using an icon 306 that represents a messaging option, as shown in FIG. 3.

In some embodiments, the information displayed in the user interface 300 may be periodically updated, for example, after a set time interval (e.g., 1 minute). In other embodiments, the displayed information may be updated whenever new information is received or made available. For example, if the first vehicle is moving, the distance field 304 for each entry 302 may be updated as the current location of the first vehicle changes, or as the first vehicle travels closer or further away from the corresponding charging station. As another example, after the remaining charge time information for a given vehicle is initially received, the corresponding remaining charge time field 304 may be periodically updated as time passes (e.g., every minute). In yet another example, the status field 304 for each entry 302 may be updated whenever new availability status information is received from the corresponding charging station (e.g., according to step 202 of the method 200).

As will be appreciated, if an information category is not applicable to a given entry, the corresponding field 304 may be left blank or read "N/A," as shown. For example, in FIG. 3, a first entry 302 of the user interface 300 lists information for a charging station with unique identifier "ID-1." According to the status field 304, the ID-1 charging station is available for charging, or in other words, is not occupied by a vehicle. Accordingly, any of the fields 304 that are related to a vehicle occupying the charging station (e.g., the remaining charge time field 304 and the message field 304) are listed as "N/A" or not applicable. As another example, FIG. 3 shows a third entry 302 that lists information for a charging station with unique identifier "ID-3." The status field 304 for the third entry 302 indicates that a vehicle is plugged into ("P/I") to the ID-3 charging station but is not charging at the moment. Accordingly, the remaining charge time field 304 displays "N/A," or not applicable. However, because the vehicle occupying the ID-3 charging station is capable of relaying messages to its vehicle operator, the message field 304 for the third entry 302 includes the messaging icon 306.

In embodiments, the user interface 300 can be configured to enable user selection of the entries 302 or one or more fields 304 within each entry 302, using a human-machine interface (HMI) (e.g., HMI 510 shown in FIG. 5) of the first vehicle, for example, in accordance with step 214 of the method 200. In some embodiments, selection of the entire entry 302 can result in one outcome, while selection of an individual field 304 within the entry 302 can result in a different outcome. For example, selection of a given entry 302 may cause the display screen to display a map (e.g., map 400 shown in FIG. 4) showing a geographical location for the charging station associated with the selected entry 302 (e.g., in accordance with step 226 of the method 200). As another example, selection of a given message field 304, or the messaging icon 304 included therein, may cause the display screen to display a prompt for entering a message to the operator of the vehicle occupying the charging station associated with the selected field 304 (e.g., in accordance with step 218 of the method 200).

Referring now to FIG. 4, shown is another example user interface 400 configured to display a map 402 showing approximate geographical locations 404 of select charging stations, in accordance with embodiments. The user interface 400 can be displayed on a display screen of the first vehicle, such as, for example, a display screen associated with a navigation system of the first vehicle or any other vehicle display included in the vehicle's HMI (e.g., HMI 510 shown in FIG. 5). In some embodiments, the map 402 further includes a real-time location 406 (e.g., current location) of the first vehicle, as shown in FIG. 4.

In some cases, the map 402 may be displayed during step 226 of the method 200, in response to a user input indicating selection of an entry 302 displayed in the user interface 300. In such cases, the map 402 may be configured to show the location 404 of the charging station associated with the selected entry 302. In other cases, the map 402 may be displayed upon identifying a group of nearby charging stations based on distance criteria associated with the first vehicle. For example, the map 402 may be displayed in order to show the locations 404 of the charging stations that are within a predefined distance (e.g., 5 miles) of the current location 406 of the first vehicle.

In some embodiments, the map 402 may be configured to graphically illustrate the availability status of each of the nearby charging stations by placing an available icon 408 or an unavailable icon 410 at the geographical location 404 of each charging station. For example, as shown in FIG. 4, the map 402 may include the available icon 408 at the geographical locations 404 of the ID-1 and ID-5 charging stations, which are shown as being "available" in the user interface 300 of FIG. 3. Likewise, the map 402 may include the unavailable icon 410 at the geographical locations 404 of the ID-2, ID-3, and ID-4 charging stations, which are shown as being "plugged-in" or "P/I" in the user interface 300 of FIG. 3.

In some embodiments, the map 402 may be displayed in response to, or in conjunction with, obtaining status information at step 202 of the method 200. Also in some embodiments, the icons 408 and 410 displayed on the map 402 may be user-selectable icons. User selection of one of the icons 408/410 may cause display of the entire user interface 300 shown in FIG. 3, or an abbreviated version (not shown) that only shows the entry 302, or the information therein, that is associated with the selected icon 408/410. For example, in response to user selection of the available icon 408 corresponding to the ID-5 charging station, the display may display the information included in the fifth entry 302 shown in FIG. 3. As another example, in response to user selection of the unavailable icon 410 corresponding to the ID-3 charging station, the display may display the information included in the third entry 302 shown in FIG. 3, including the messaging icon 306.

Referring now to FIG. 5, shown is an example vehicle computing system (VCS) 500 that may be included in the requesting vehicle 102 and/or one or more of the occupying vehicles 114 and 116, for example, as part of a vehicle electronics system or an infotainment system of the vehicle. In some cases, the VCS 500 may be an infotainment system such as the SYNC® system manufactured by FORD MOTOR COMPANY®. Other embodiments of the VCS 500 can include different, fewer, or additional components than those described below and shown in FIG. 5.

As illustrated, the VCS 500 comprises a data processor 502 (e.g., an electronic data processor), a data storage device 504, and a vehicle data bus 506. The VCS 500 can further include various electronic control units (ECUs) responsible for monitoring and controlling the electrical systems or subsystems of the vehicle. Each ECU may include, for example, one or more inputs and outputs for gathering, receiving, and/or transmitting data, a memory for storing the data, and a processor for processing the data and/or generating new information based thereon. In the illustrated embodiment, the ECUs of the VCS 500 include a telematics control unit 508, a human machine interface (HMI) 510, and a battery control module 512. Though not shown, the VCS 500 may include other ECUs, such as, for example, a body control module (BCM) for controlling and monitoring various electronic accessories in a body of the vehicle and a powertrain control module for controlling and monitoring an engine and transmission of the vehicle.

The ECUs of the VCS 500 are interconnected by the vehicle data bus 506 (such as, e.g., a controller area network (CAN) bus or an automotive Ethernet bus), which passes data to and from the various ECUs, as well as other vehicle and/or auxiliary components in communication with the VCS 500. Further, the data processor 502 can communicate with any one of the ECUs and the data storage device 504 via the data bus 506 in order to carry out one or more functions, including the functions associated with a charging station locator 514 and/or a messaging application 516. The data processor 502 can comprise one or more of a microprocessor, a microcontroller, a programmable logic array, an application-specific integrated circuit, a logic device, or other electronic device for processing, inputting, outputting, manipulating, storing, or retrieving data. In embodiments, the VCS 500 can comprise a general purpose computer that is programmed with various programming instructions or modules stored in the data storage device 504 or elsewhere.

The data storage device 504 can comprise one or more of electronic memory, nonvolatile random access memory (e.g., RAM), flip-flops, a computer-writable or computer-readable storage medium, a magnetic or optical data storage device, a magnetic or optical disc drive, a hard disk drive, or other electronic device for storing, retrieving, reading, or writing data. The data storage device 504 stores one or more software program modules or software instructions for execution by the data processor 502. For example, as shown in FIG. 5, the data storage device 504 may store the charging station locator 514, which includes software instructions for locating nearby charging stations based on distance criteria received from the body control module 512 or from the vehicle operator via the HMI 510. As also shown in FIG. 5, the data storage device 504 may store the messaging application 516 for contacting a designated operator or owner of a vehicle occupying a charging station.

The telematics control unit (TCU) 508 can be an ECU for enabling the vehicle to connect to one or more wireless networks, such as, for example, WiFi, cellular, Bluetooth, NFC, RFID, satellite, DSRC, and infrared. In embodiments, the TCU 508 includes a wireless communication module 518 comprising one or more antennas, radios, modems, receivers, and/or transmitters (not shown) for connecting to, or interfacing with, the various wireless networks. In the illustrated embodiment, the wireless communication module 518 includes one or more short-range transceivers 520 for wirelessly communicating with other vehicles (e.g., occupying vehicles 114 and 116 shown in FIG. 1) and DSRC infrastructure (e.g., charging stations 106 and 108 and/or roadside equipment 112 shown in FIG. 1) over the DSRC network, or for communicating with other nearby components of the environment 100 using another short-range network (e.g., Bluetooth, infrared, RFID, NFC, Zigbee, etc.). The wireless communication module 518 can also include a wireless modem 522 for facilitating communication over an 802.11 network (e.g., WiFi), a WiMax network, or other internet access networks. As an example, the wireless modem 522 may be used to communicate with a remote server and/or a mobile device associated with the vehicle (e.g., mobile devices 122 and 124 shown in FIG. 1). In embodiments, the wireless communication module 518 can also include a mobile communication unit (not shown) for wirelessly communicating over a cellular network (e.g., GSM, GPRS, LTE, 3G, 4G, CDMA, etc.), and/or a satellite network.

In embodiments, the TCU 508 receives external data from one or more components of the environment 100 via the wireless communication module 518, and provides the external data to the data processor 502, the data storage device 504, the HMI 510, or any other appropriate component of the VCS 500. For example, once the TCU 508 receives status information from the nearby charging stations (e.g., at step 202 of the method 200), the TCU 508 can provide the received status information to the data processor 502, via the vehicle data bus 506, for processing. Based on the status information, the data processor 502 can determine which charging stations are occupied by a vehicle and are charging a vehicle battery. As another example, once the TCU 508 receives remaining charge time information from the occupying vehicles (e.g., at step 208 of the method 200), the TCU 508 can provide the received remaining charge times to the data processor 502, via the vehicle data bus 506, for processing. The data processor 502 can provide the remaining charge times to the HMI 510 for display in the user interface 300 (e.g., in accordance with step 210 of the method 200).

In addition, the TCU 508 can transmit internal data to components of the environment 100, such as, e.g., the occupying vehicles 114 and 116, via the wireless communication module 518. The TCU 508 may receive the internal data from the data processor 502, the data storage device 504, the HMI 510, or other component of the VCS 500. For example, once the data processor 502 generates a request for remaining charge time for each vehicle occupying a charging station, the data processor 502 can send the request to the TCU 508 for transmission to the occupying vehicles within the environment 100. Likewise, once the data processor 502 receives a message requesting estimated departure time, as entered by the user via the HMI 510, the data processor 502 can send the message to the TCU 508 for transmission to the intended occupying vehicle 114/116.

According to embodiments, the human-machine interface (HMI) 510 can be an ECU for enabling user interaction with the vehicle and for presenting vehicle information to the vehicle operator or driver. The HMI 510 can be configured to interact with other ECUs of the vehicle, including the TCU 508, the data storage device 504, and/or the data processor 502, via the data bus 506, in order to provide information or inputs received via the HMI 510 to an appropriate component of the VCS 500 and to present, to the vehicle operator, information or outputs received from the various components of the VCS 500.

The HMI 510 can comprise one or more displays 524 (or display screens), audio speakers, and input devices 526, as well as various other devices for inputting, entering, receiving, capturing, displaying, or outputting data associated with the vehicle computing system 500, and/or the techniques disclosed herein. The input device(s) 526 can include, for example, one or more of a keyboard, keypad, pointing device (e.g., electronic or optical mouse), button or push button, slider, switch, knob, dial, touch input device, microphone, and any other type of input device. The display(s) 524 can include a touchscreen configured to receive touch inputs and/or a display screen configured to display information for a navigation system, audio system, and/or other aspect of the infotainment system of the vehicle. In embodiments, the HMI 510 can be used by the vehicle operator to enter, select, or generate a message to the occupying vehicle operator using one or more of the input devices 526 and/or the displays 524. In addition, the HMI 510 can be used to display the user interface 300 and/or the user interface 400, to receive user inputs associated with the user interface 300 and/or the user interface 400, to prompt entry of a message to the occupying vehicle operator, and to display a reply message received from the occupying vehicle operator.

The battery control module 512 (also referred to a "battery management system (BMS)") can be an ECU for managing one or more rechargeable batteries included in the vehicle. In embodiments, the battery control module 512 can be configured to protect the rechargeable battery, for example, by preventing the battery from operating outside its safe operating area, calculate the state of charge (SOC) or depth of discharge (DDD) of the rechargeable battery to indicate the charge level of the battery, calculate the state of health (SOH) for indicating the overall condition of the battery, calculate other secondary data related to the battery (e.g., current, voltage, temperature, etc.), monitor these and other performance characteristics of the battery, and report the calculated values and/or overall performance of the rechargeable battery to other ECUs and/or the data processor 502, as needed. In some embodiments, the battery control module 512 also calculates an amount of time required to fully charge the rechargeable battery (e.g., a remaining charge time). The battery control module 512 may calculate the remaining charge time based on a current charge level of the rechargeable battery. In some cases, the remaining charge time may be calculated only while the vehicle is plugged into a charging station.

The battery control module 512 may communicate with the data processor 502 and/or the TCU 508, via the data bus 506, in order to carry out certain techniques described herein. For example, if the vehicle receives a request for remaining charge time via the TCU 508, the data processor 502 can retrieve the remaining charge time information from the battery control module 512, via the vehicle data bus 506, and provide the remaining charge time to the TCU 508 for transmission to the vehicle requesting the information.

Thus, techniques described herein provide systems and methods to help a vehicle locate available, or soon-to-be available, charging stations and communicate with vehicles that are occupying currently unavailable charging stations, or with the operators of said vehicles. For example, a vehicle seeking to recharge a vehicle battery can use a V2I communication protocol to wirelessly communicate with charging stations or other DSRC infrastructure within a pre-defined radius of the vehicle's current location (e.g., nearby charging stations). The charging stations can send their status, such as, e.g., available, plugged-in and charging, plugged-in and not charging, etc., to the requesting vehicle. The requesting vehicle can display the received charging station information on a display or other human-machine interface (HMI) of the vehicle, in a navigation map format and/or as an information table. The map and/or information table may include user-selectable options that enable the vehicle operator to select a desired charging station from the plurality of charging stations displayed on the map or table. For example, the user may select the desired charging station in order to obtain driving directions to the station (e.g., using a navigation system of the requesting vehicle). The requesting vehicle can use a V2V communication protocol to obtain an estimated remaining charge time from each vehicle that is plugged-into one of the charging stations and charging a vehicle battery. The requesting vehicle may also request other information from the occupying vehicle, such as vehicle identification information and/or geographical location information (e.g., GPS coordinates). The requesting vehicle can then display the remaining charging time in association with other received information on the HMI for viewing by the vehicle operator, for example, as an information table. The vehicle operator can use the information table to decide whether to wait for an occupied charging station to become available or search for other charging stations. In embodiments, the information table also indicates whether the vehicle occupying a given charging station is connected to the vehicle operator's mobile communications device via a V2D communication protocol. If V2D communication is available for the occupying vehicle, the information table can include a user-selectable option for sending a message to the operator of the occupying vehicle in order to find out when the operator plans to depart from the charging station.

In certain embodiments, the process descriptions or blocks in the figures, such as FIG. 2, can represent modules, segments, or portions of code which include one or more executable instructions for implementing specific logical functions or steps in the process. Any alternate implementations are included within the scope of the embodiments described herein, in which functions may be executed out of order from that shown or discussed, including substantially concurrently or in reverse order, depending on the functionality involved, as would be understood by those having ordinary skill in the art.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

The invention claimed is:

1. A vehicle system, comprising:
 a telematics unit configured to wirelessly communicate with a second telematics unit of a second vehicle electrically coupled to a charging station;
 a processor configured to obtain a remaining charge time from the second vehicle, using the telematics unit;
 a display for displaying the remaining charge time in association with information related to the second vehicle; and
 a user interface for receiving a user input associated with the displayed information, wherein in response to the user input, the processor prompts, via the user interface, entry of a message to an operator of the second vehicle, and the telematics unit sends the message to the second telematics unit for relay to a mobile communications device associated with the second vehicle.

2. The vehicle system of claim 1, wherein the telematics unit is further configured to wirelessly communicate with the charging station, and the processor is further configured to obtain status information from the charging station using the telematics unit, and wherein the processor obtains a remaining charge time if the status information indicates an unavailability of the charging station.

3. The vehicle system of claim 2, wherein the displayed information further includes the status information associated with the charging station.

4. The vehicle system of claim 1, wherein in response to the user input, the display displays a map indicating a geographical location of the charging station.

5. The vehicle system of claim 1, wherein the displayed information includes a user-selectable option to send a message to the operator of the second vehicle, and the user input includes selection of said option.

6. The vehicle system of claim 1, wherein the message is a request for an estimated departure time of the second vehicle from the charging station.

7. The vehicle system of claim 6, wherein the processor is further configured to receive a reply message from the second vehicle via the telematics unit, the reply message including the estimated departure time.

8. The vehicle system of claim 1, wherein the telematics unit uses dedicated short-range communication to wirelessly communicate with the second telematics unit.

9. A method of determining availability of a vehicle charging station in a vehicle, comprising:
 establishing, using a telematics unit, wireless communication with a second telematics unit of a second vehicle electrically coupled to the charging station;
 obtaining, using a processor, a remaining charge time from the second vehicle via the telematics unit;
 displaying, on a display, the remaining charge time in association with information related to the second vehicle;
 receiving, via a user interface, a user input associated with the displayed information;
 in response to receiving the user input, prompting, via the user interface, entry of a message to an operator of the second vehicle; and
 sending, using the telematics unit, the message to the second telematics unit for relay to a mobile communications device associated with the second vehicle.

10. The method of claim 9, further comprising:
 obtaining status information from the charging station using the processor and the telematics unit, wherein the obtaining a remaining charge time occurs if the status information indicates an unavailability of the charging station.

11. The method of claim 10, wherein the displayed information further includes the status information associated with the charging station.

12. The method of claim 9, further comprising:
 in response to receiving the user input, displaying, on the display, a map indicating a geographical location of the charging station.

13. The method of claim 9, wherein the displayed information includes a user-selectable option to message the operator of the second vehicle, and the user input includes selection of said option.

14. The method of claim 9, wherein the message is a request for an estimated departure time of the second vehicle from the charging station.

15. The method of claim 14, further comprising:
 receiving a reply message from the second vehicle via the telematics unit, the reply message including the estimated departure time.

16. The method of claim 9, wherein the telematics unit uses dedicated short range communication to wirelessly communicate with the second telematics unit.

17. A vehicle comprising:
antennas;
a user interface; and
processors configured to:
obtain, from a second vehicle coupled to a charging station, information including a remaining charge time of the second vehicle;
responsive to receiving a user input associated with the information, prompt entry of a message to the second vehicle; and
send the message to the second vehicle for relay to a mobile device associated with the second vehicle.

\* \* \* \* \*